United States Patent [19]

Johnson

[11] 4,008,475
[45] Feb. 15, 1977

[54] STABILIZING AND CALIBRATION CIRCUIT FOR FM-CW RADAR RANGING SYSTEMS
[75] Inventor: Henry Charles Johnson, Neshanic, N.J.
[73] Assignee: RCA Corporation, New York, N.Y.
[22] Filed: Nov. 12, 1975
[21] Appl. No.: 631,325
[52] U.S. Cl. .................................. 343/14; 343/7.5
[51] Int. Cl.² .................... G01S 9/23; G01S 9/02
[58] Field of Search .............................. 343/14, 7.5
[56] References Cited
UNITED STATES PATENTS
2,528,119  10/1950  Crosby ................................ 343/14
3,303,497  2/1967  Chubb ................................ 343/14

Primary Examiner—Maynard R. Wilbur
Assistant Examiner—S. C. Buczinski
Attorney, Agent, or Firm—E. J. Norton; J. D. Lazar; M. A. Lechter

[57] ABSTRACT

A frequency-modulated continuous wave (FM-CW) ranging system wherein continuous feedback to the FM oscillator of the system eliminates drift in frequency excursions of the FM waveform.

4 Claims, 1 Drawing Figure

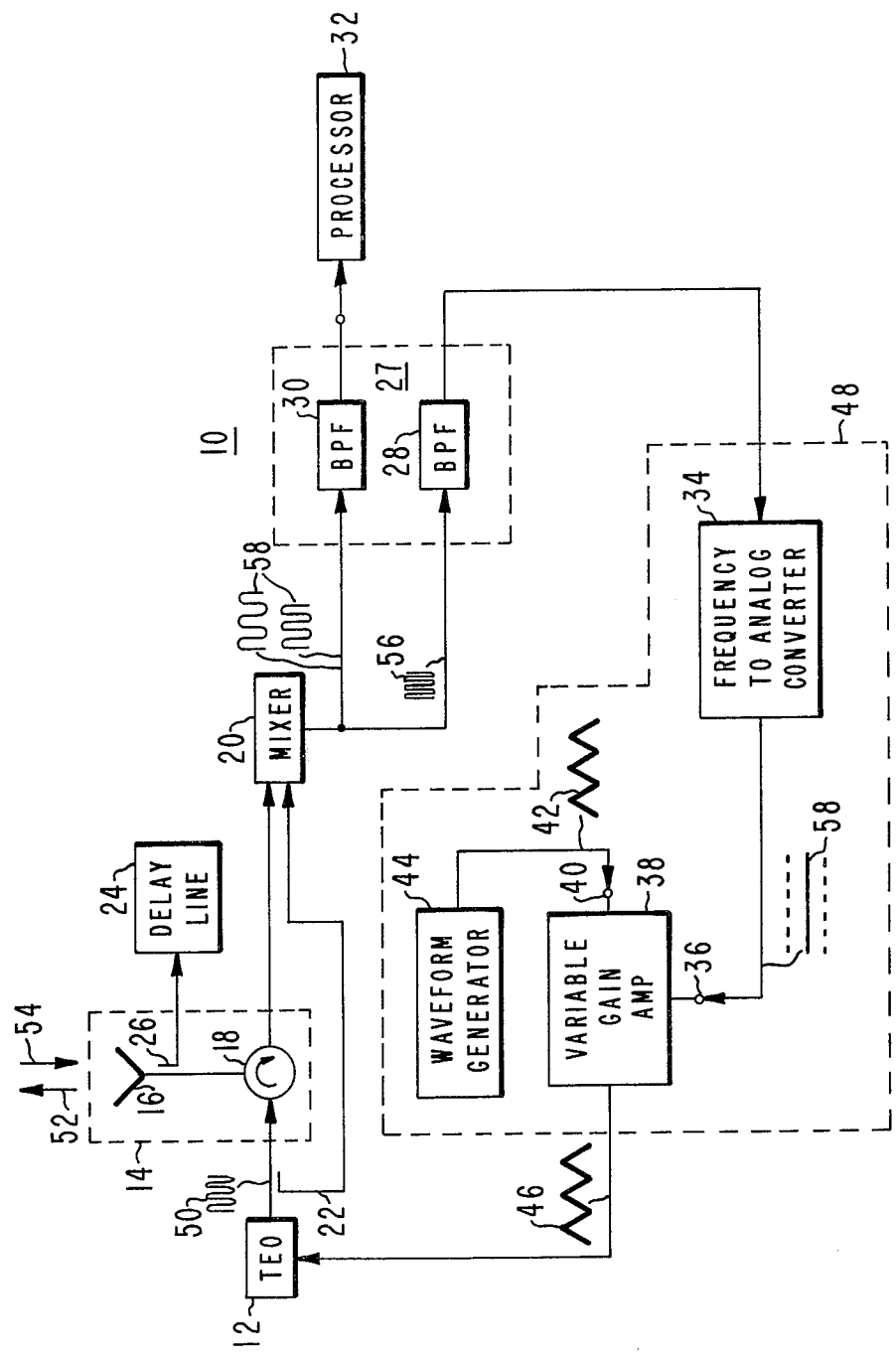

STABILIZING AND CALIBRATION CIRCUIT FOR FM-CW RADAR RANGING SYSTEMS

CROSS REFERENCES TO RELATED APPLICATIONS

Of interest are the following copending applications: Ser. No. 536,558, now U.S. Pat. No. 3,968,492 entitled "Adaptive Parameter Processor for CW Radar Ranging System" by G. Kaplan and Ser. No. 536,559, now U.S. Pat. No. 3,974,501 "Dual Mode Adaptive Parameter Processor for Continuous Wave Radar Ranging Systems" by A. Ritzie, both filed Dec. 26, 1974; and Ser. No. 593,016 by F. Sterzer and G. Kaplan, entitled "Dual Mode Automobile Collision Avoidance Radar", filed July 3, 1975, all having been assigned to the same assignee as the present application.

BACKGROUND OF THE INVENTION

1. Field of the Invention

The present invention relates to continuous-wave frequency-modulated (FM-CW) ranging systems and, in particular, to a modulation rate and frequency excursion drift compensator for use therein.

2. Description of the Prior Art

Frequency-modulated continuous-wave (FM-CW) radar ranging systems are well known in the art. In such systems, an interrogation signal, frequency modulated with a given modulation waveform, is transmitted towards a target and reflected therefrom back to the interrogating unit. The reflected signal as received at the interrogating unit is delayed in time, and hence shifted in frequency, from the instantaneous interrogation signal by an amount ($\tau$) proportional to the range (R) of the target. For example, when the interrogation signal is modulated in accordance with a triangular waveform having a peak value of $\Delta F$ and a period of $1/f_m$, the frequency shift or difference frequency $f_R$, as generated by a suitable filtered mixer receptive of the reflected signal and a signal indicative of the interrogation signal, is equal to the time derivative of the frequency of the interrogation signal times the round trip time delay $\tau$ and may be expressed as:

$$f_R = \frac{df}{dt} \cdot \tau = \frac{4\Delta F f_m R}{C} \quad (1)$$

where C is the speed of light. The range between the target and the interrogating unit is determined by measurement of the frequency shift $f_R$.

In practice, such FM-CW radar ranging systems have been plagued with errors due to drifts in the maximum frequency excursion ($\Delta F$) and period ($1/f_m$) of the frequency modulation waveform of the interrogation signal and by drifts in the system clock. Such drifts are often caused merely by changes in ambient conditions, such as temperature changes, power supply variations and timing circuit drifts. The aforementioned copending applications Ser. Nos. 536,558 and 536,559, respectively, by Kaplan and Ritzie, disclose signal processors for FM-CW ranging systems which, in addition to substantially reducing quantization error, make provisions for compensating for drifts in the period ($1/f_m$) of the modulation waveform and in the system clock. However, no provision is made for compensating for drifts in the frequency excursion ($\Delta F$) of the modulation waveform.

The prior art has typically used one of two methods of compensating for drifts in the frequency excursion. In one such prior art method, a delay line of known length is connected between the transmitter and receiver antenna feed lines. The time delayed signal, generated by the delay line from a portion of the interrogation signal simulates a reflected signal from a target at a predetermined range. The processor is then adjusted to display the predetermined range. Such a method is disadvantageous in that any subsequent changes in the modulation frequency or amplitude require recalibration of the system. A second prior art method utilizes a delay line in conjunction with frequency discriminators in a complex closed loop stabilizing system. Such a system is described in "The Radar Handbook", M. I. Skolnik, McGraw-Hill, 1970, Chapter 16, page 32. However, frequency discriminators are relatively expensive and not suitable for large scale usage, such as in automotive collision avoidance radars. Such frequency discriminator systems maintain constant only the frequency excursion $\Delta F$, and, moreover, are typically not accurate if the frequency $f_m$ of the modulation waveform drifts, thus requiring that the ranging system employ, for example, relatively expensive crystal oscillators, temperature controlled ovens, or both.

SUMMARY OF THE INVENTION

The present invention is directed to a FM-CW ranging system including means for delaying a portion of the interrogation signal by a predetermined time interval corresponding to a reflected signal from a target at a predetermined range outside of the range domain of the ranging system. A first signal consisting substantially of difference signals corresponding to the predetermined range and a second signal consisting substantially of difference signals corresponding to ranges within the range domain of the system are generated; the second signal being applied to a signal processor and the first output signal being applied to means for changing the product of the maximum amplitude and the frequency of the predetermined waveform in accordance with the difference frequency corresponding to the predetermined range. Since the difference frequency is proportional to the product of $\Delta f$ and $f_m$, the present invention thus compensates for changes in either $\Delta f$ or $f_m$.

BRIEF DESCRIPTION OF THE DRAWING

The sole FIGURE of the drawing is a block diagram of an FM-CW radar 10 in accordance with the present invention.

DESCRIPTION OF THE PREFERRED EMBODIMENT

Referring to the drawing, a voltage controlled oscillator (VCO) 12, such as a varactor tuned transferred electron (GUNN) oscillator, is connected to a suitable antenna network 12. Antenna 16 is suitably a printed circuit corporate feed antenna of the type described in U.S. Pat. No. 3,587,110, issued June 22, 1971 to O. M. Woodward or a standard gain horn antenna such as a Narda model 640. Output signals from antenna network 14 are applied to means for deriving difference signals, suitably a conventional mixer 20, such as an Anaren model 7G0118 mixer. Mixer 20 is also receptive of a sample of the VCO output signal (50) through a directional coupler 22. A single port microwave acoustic delay line 24 is coupled through a directional coupler 26 between circulator 18 and antenna 16, such that it is receptive of a portion of the VCO output signal (50). The delayed signal generated by delay line 24 is routed through circulator 18 to mixer 20 in a manner to be described.

The difference signals from mixer 20 are applied to means 27 for generating a first output signal consisting substantially of difference signals associated with the output signal of delay line 24 and a second output signal corresponding to reflections from targets within the range domain of radar 10. Means 27 suitably comprises first and second bandpass filters 28 and 30, the input terminals of both being coupled to mixer 20. The output signals of bandpass filter 28 and 30 may be, if desired, amplified.

Bandpass filter 28 is connected to means (48) for adjusting the product ($\Delta F \times f_m$) of the maximum frequency excursion ($\Delta F$) and modulation period ($f_m$) of interrogation signal 52. Specifically, filter 28 is coupled to a conventional frequency-to-analog (F/A) converter 34, suitably comprising a monostable multivibrator, coupled to a R-C network (neither shown), wherein the output pulses of the multivibrator are time averaged by the RC network to provide an analog indication of frequency. F/A converter 34 is connected to the gain control terminal 36 of a variable gain amplifier 38. Variable gain amplifier 38 is receptive of, at input terminal 40, a periodic signal 42 having a predetermined maximum amplitude and frequency. Signal 42 is generated by a conventional waveform generator 44 such as a Wavetek model 180 waveform generator. The output signal 46 of variable gain amplifier 38 is applied as a control signal to VCO 12.

Bandpass filter 30 is connected to a signal processor 32. Processor 32 suitably comprises means for detecting respective difference frequencies corresponding targets at ranges within the range domain of radar 10. Suitable processors 32 are described in U.S. Pat. No. RE 28,302 to Staras and Shefer, dated Jan. 14, 1975 and in the aforementioned applications Ser. Nos. 536,558 and 536,559 respectively by Kaplan and Ritzie.

In the operation of the radar 10, VCO 12 generates a continuous wave signal 50 which is frequency modulated in accordance with signal 46 from variable gain amplifier 38. VCO output signal 50 is applied to circulator 18 whereby it is routed to antenna 16 which radiates signal 50 as FM-CW interrogation signal 52. Interrogation signal 52 illuminates a target (not shown) at a distance or range from radar 10 and is reflected therefrom back to radar 10 as reflected signal 54. Reflected signal 54 is received by antenna 16 and routed by circulator 18 to mixer 20. In addition, samples of TEO output signal 50 are taken by directional couplers 22 and 26 and applied respectively to mixer 20 and delay line 24. Delay line 24 delays the applied portion of VCO output signal 50 by a time interval ($t$) corresponding to the round trip transit time ($\tau$) between radar 10 and a target at a predetermined range beyond, it should be noted, the maximum useful range of the radar 10. The delayed signal is passed from delay line 24 to circulator 18 and therefrom to mixer 20. Mixer 20 generates difference signals 56 and 58 having frequencies respectively indicative of the frequency differences between the delayed signal and the instantaneous sample of VCO output signal 50 and the frequency difference between reflected signals 54 and the instantaneous sample of VCO output signal 50. Such difference signals 56 and 58 shall hereinafter be respectively referred to as calibration signal 56 and target signals 58. As shown in the drawing, plural target signals 58 indicative of respective targets at various ranges may exist. Bandpass filter 30 is responsive to difference frequencies within a bandwidth corresponding to a chosen range domain, that is, ranges within a predetermined maximum and minimum range and rejects difference signals with frequencies outside of such bandwidth. The length of delay line 24, and hence the delay t, is chosen such that the resultant difference frequency ($f_{cd}$) of calibration signal 56, ($f_{cd}=2(\Delta F \times f_m)t$) is outside of the bandwidth of bandpass filter 30. Thus, only signals indicative of targets within the range domain of radar 10 are applied to processor 32. Similarly, bandpass filter 28 is responsive only to frequencies corresponding to calibration signal 56 and rejects difference frequencies corresponding to targets within the range domain of radar 10. Calibration signal 56 is applied to frequency-to-analog converter 34, which generates a voltage level 58 to control the gain of variable gain amplifier 38. Variable gain amplifier 38 accordingly alters the maximum amplitude of signal 46, which in turn varies the frequency modulation waveform of VCO output signal 50. The maximum amplitude of signal 46, is thus continuously adjusted, in a closed loop manner, such that the product ($\Delta F \times f_m$) of the maximum frequency excursion $\Delta F$ times the repetition frequency $f_m$ of the frequency modulation of VCO output signal 50 remains constant, stabilizing thereby the range to difference frequency response of radar 10.

It should be noted that feedback signal 58 may, in the alternative, be applied directly to waveform generator 44 to vary the frequency, rather than the amplitude, of signal 42, to control thereby the product $\Delta F \times f_m$. Variable gain amplifier 38 can be thus omitted or replaced with a constant gain amplifier.

It should be appreciated that an antenna network 14 may be utilized comprising a pair of antennas rather than signal antenna 16 and circulator 18. In such case, VCO 12 would be connected directly to a transmitting antenna and a receiving antenna connected directly to mixer 20. A two port delay line 24 would be utilized, coupled between the transmitting and receiving antennas by directional couplers. It should further be appreciated that the present invention may be utilized in a cooperative harmonic radar such as described in the above-mentioned U.S. Pat. No. RE 28,302 to Staras and Shefer. In such case, an appropriate frequency multiplier is inserted between directional coupler 22 and mixer 20. It should still further be appreciated that processor 32 may be switched between bandpass filter 30 and bandpass filter 28 for a readout of the range corresponding to delay time $\tau$ of delay line 24 to ensure thereby that the radar is calibrated and operating properly.

What is claimed is:
1. In a frequency-modulated continuous wave ranging system of the type including: first means for generating a continuous wave interrogation signal, said interrogation signal being frequency modulated in accordance with the amplitude of a predetermined waveform, the amplitude of said predetermined waveform being periodic at a predetermined rate and having a predetermined maximum amplitude; second means for transmitting said interrogation signal to targets and receiving reflected signals from said targets in response thereto; third means for deriving difference signals indicative of the frequency differences of said reflected signals from the instantaneous frequency of said interrogation signal; and fourth means for determining from said difference signals the range between said ranging system and targets within a predetermined domain of ranges, the improvement wherein:

said ranging system further comprises fifth means, responsive to said interrogation signal, for delaying a portion of said interrogation signal by a predetermined time interval and applying said delayed signal to said third means;

said delayed signal corresponding to a reflected signal from a target at a predetermined range outside of said predetermined range domain;

sixth means, responsive to said difference signals, for generating first and second output signals, said first output signal consisting substantially of difference signals corresponding to said predetermined range and said second output signal consisting substantially of said difference signals corresponding to ranges within said predetermined range domain, said second output signal being applied to said fourth means; and seventh means, responsive to said sixth means first output signal, for changing the product of said periodic rate and said maximum amplitude of said predetermined waveform in accordance with the difference corresponding to said predetermined range.

2. The ranging system of claim 1, wherein:
said sixth means comprises a first bandpass filter, responsive to difference frequencies within a first predetermined bandwidth about said difference frequency corresponding to said predetermined range; and a second bandpass filter responsive to difference frequencies corresponding to ranges within said predetermined range domain.

3. The ranging system of claim 1, wherein said seventh means comprises eighth means for varying said maximum amplitude in accordance with said difference frequency corresponding to said predetermined range.

4. The ranging system of claim 3 wherein said eighth means comprises ninth means, responsive to said sixth means first output signal, for generating an output signal voltage indicative of the difference frequency corresponding to said predetermined range; and a variable gain amplifier, receptive of said predetermined waveform and responsive in gain to said ninth means output signal.

* * * * *